United States Patent
Lehman

[19]

[11] Patent Number: 5,853,348
[45] Date of Patent: Dec. 29, 1998

[54] PARK POSITION LOCKING SYSTEM FOR STEERING COLUMN TRANSMISSION SHIFTER

[75] Inventor: Michael J. Lehman, Fort Wayne, Ind.

[73] Assignee: Navistar International Transportation Corp, Chicago, Ill.

[21] Appl. No.: 752,761

[22] Filed: Nov. 20, 1996

[51] Int. Cl.⁶ .............................. B60K 41/28; B60K 41/26
[52] U.S. Cl. .......................................... 477/96; 192/220.2
[58] Field of Search ................ 192/4 A; 477/96, 477/99

[56] References Cited

U.S. PATENT DOCUMENTS

| | | | |
|---|---|---|---|
| 3,994,183 | 11/1976 | Markl et al. .......................... | 74/473 R |
| 4,473,141 | 9/1984 | Mochida ................................. | 477/94 |
| 5,018,610 | 5/1991 | Rolinski et al. ...................... | 192/4 A |
| 5,062,509 | 11/1991 | Carpenter et al. .................... | 192/4 A |
| 5,211,271 | 5/1993 | Osborn et al. ........................ | 192/4 A |
| 5,220,984 | 6/1993 | Ruiter .................................... | 192/4 A |
| 5,314,049 | 5/1994 | Nordstrom ............................ | 192/4 A |
| 5,601,162 | 2/1997 | Heimann ............................... | 192/4 A X |
| 5,647,818 | 7/1997 | Moody .................................. | 192/4 A X |
| 5,706,703 | 1/1998 | Kim ....................................... | 192/4 A X |

*Primary Examiner*—Rodney H. Bonck
*Attorney, Agent, or Firm*—Dennis K. Sullivan; Jeffrey P. Calfa

[57] ABSTRACT

A system for selectively locking a steering-column-mounted transmission shifter in a park position that places the transmission in one of two neutral positions. An electrically operated shift lock releasably locks the shifter in park position. The shift lock is under the control of an electric circuit that contains first and second shift lock relays having normally open contacts connected in series to the shift lock. The electric circuit operatively couples the relays' coils with the ignition switch, a transmission neutral position sensing switch, and a service brake sensing switch. When the service brakes are applied and the ignition switch is on, the shift lock is operated to release the shifter, allowing the shifter to be moved to other positions.

15 Claims, 1 Drawing Sheet

PARK POSITION LOCKING SYSTEM FOR STEERING COLUMN TRANSMISSION SHIFTER

FIELD OF THE INVENTION

This invention relates generally to automotive vehicles, and more particularly to a vehicle in which a locking system locks a steering-column-mounted transmission shifter in PARK position and unlocks the transmission shifter when the vehicle's ignition switch is operated to on position and the service brake pedal is also operated to apply the vehicle's service brakes.

BACKGROUND AND SUMMARY OF THE INVENTION

A known automotive vehicle powertrain comprises an engine that is coupled through a transmission to axle-mounted wheels. The transmission assumes different operating positions corresponding to those selected by the positioning of a shifter, a shift lever for example, operated by the vehicle driver.

In certain vehicles, a transmission locking system locks the transmission in PARK position so that it cannot be shifted out of PARK position until the ignition switch has been operated by the driver to ON position and the driver has depressed the service brake pedal to apply the vehicle's service brakes. In some of those vehicles a PARK position lock, such as a locking lug, is mounted directly on the transmission and is released when the ignition switch has been operated ON and the service brakes have also been applied. Certain other transmissions lack transmission-mounted locks, and it is toward vehicles having those transmissions that the present invention is directed.

Examples of vehicles having transmissions that lack transmission-mounted locks are certain trucks. In those trucks the transmission has two NEUTRAL positions that correspond respectively to the shifter being in PARK position and NEUTRAL position respectively. When the shifter is positioned in NEUTRAL position, the transmission is placed in one of its NEUTRAL positions; when the shifter is placed in PARK position, the transmission is placed in the other NEUTRAL position. In both NEUTRAL positions, the transmission does not transmit power to the vehicle's wheels. Placement of the shifter in the PARK position however, also causes the vehicle's parking brakes to be applied, whereas the shifter's placement in the NEUTRAL position does not cause parking brake application.

In a general respect, the present invention relates to a transmission locking system wherein placement of the shifter in PARK position causes the shifter to be locked in that position by a spring-loaded locking plunger. As a consequence, the transmission is locked in one of its two NEUTRAL positions and the vehicle's parking brakes are concurrently applied. With the shifter mounted on the vehicle's steering column, release of the locking plunger is accomplished by a steering-column-mounted solenoid and an associated electric circuit that includes other components. The locking plunger is retracted in response to the ignition switch being operated ON position and the service brake pedal being simultaneously depressed to apply the service brakes. With the locking plunger retracted, the shifter can be moved out of PARK position, and correspondingly operate the transmission to any of several positions selected by the shifter. The system is adapted for both new vehicles and for retrofitting of existing vehicles.

The foregoing, along with further features and advantages of the invention, will be seen in the following disclosure of a presently preferred embodiment of the invention depicting the best mode contemplated at this time for carrying out the invention. The disclosure includes a drawing, as now briefly described, followed by a detailed description.

DESCRIPTION OF THE PREFERRED EMBODIMENT

Figure 1:
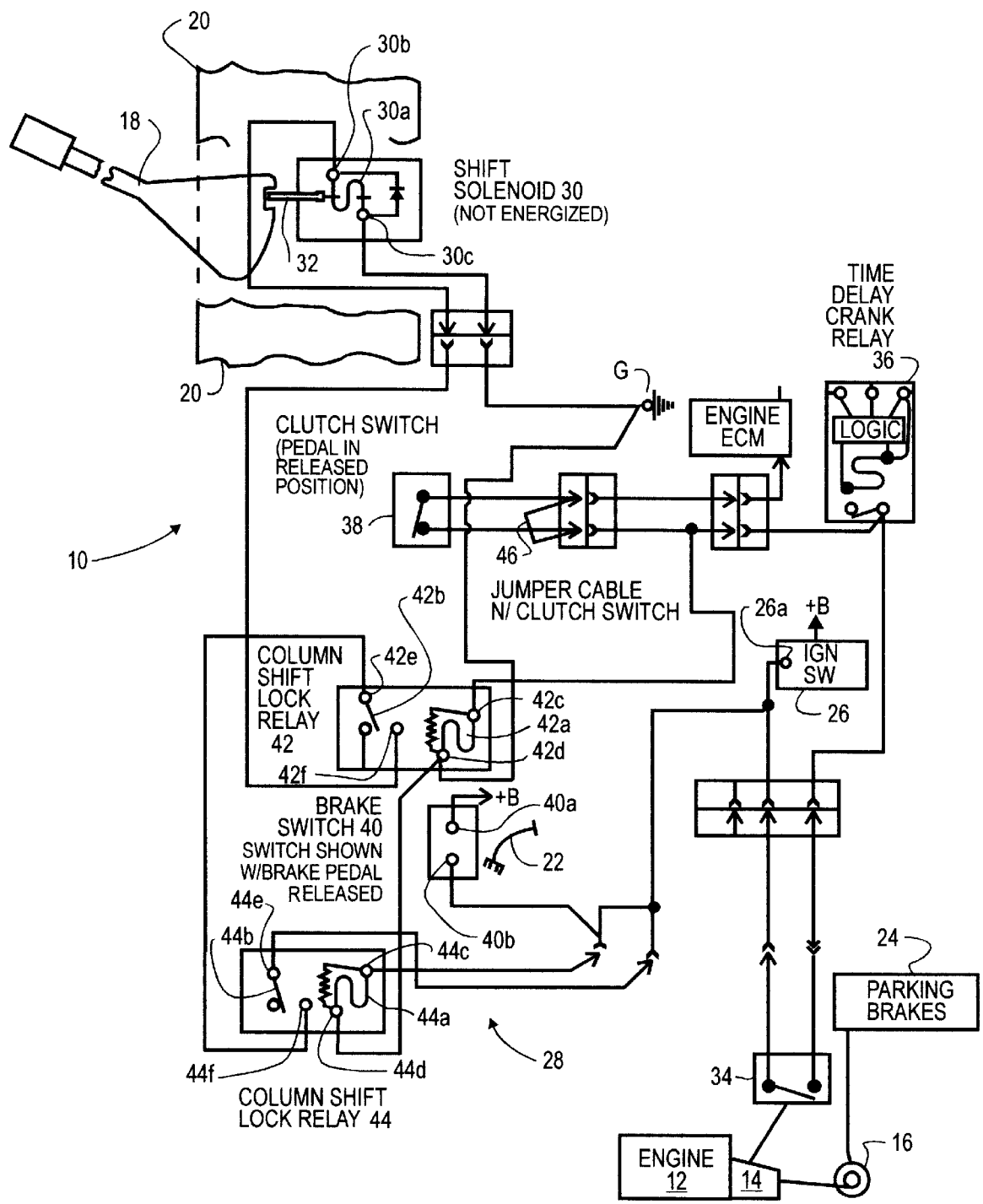
FIG. 1 is a schematic diagram of relevant portions of a steering-column-mounted transmission shifter locking system embodying principles of the present invention.

FIG. 1 shows an exemplary embodiment of the inventive PARK position locking system 10 in an automotive vehicle, a truck for example, that comprises an engine 12 coupled through a transmission 14 to axle-mounted wheels 16. A shifter 18, such as a shift lever, for shifting transmission 14 to various positions is mounted on a steering column 20. The vehicle also has service brakes 22 that are foot-pedal operated and parking brakes 24 that can be shift- cable- and/or hand-operated. Parking brakes 24 can be directly operated by hand by the driver, but when transmission shifter 18 is placed in PARK position, the, parking brakes are automatically applied by an operative coupling, such as a shift cable (not specifically shown in FIG. 1), from the shifter.

Transmission 14 has FORWARD and REVERSE drive positions for coupling engine power to the wheels, and it also has two NEUTRAL positions that correspond respectively to shifter 18 being in PARK position and NEUTRAL position respectively. When shifter 18 is positioned in NEUTRAL position, transmission 14 is placed in one of its NEUTRAL positions without automatically applying parking brakes 24; when the shifter is placed in PARK position, the transmission is placed in the other NEUTRAL position and the parking brakes are automatically applied. In both NEUTRAL positions, the transmission does not transmit power to the vehicle's wheels.

According to principles of the present invention, placement of shifter 18 in PARK position causes transmission 14 to be locked in one of its two NEUTRAL positions and the vehicle's parking brakes 24 to be concurrently applied. Release of the lock, in response to the vehicle's ignition switch 26 being operated ON position and the service brake pedal being simultaneously depressed to apply service brakes 22, is accomplished by an electric circuit 28 that includes a steering-column-mounted shift solenoid 30 for retracting a spring-loaded plunger 32 out of locking relationship with shifter 18, thereby allowing the shifter to be moved out of PARK position, and correspondingly operate transmission 14 to any of several positions as selected by shifter 18.

Additional components associated with electric circuit 28 include: a transmission NEUTRAL position sensing switch 34; a crank relay 36; a clutch switch 38 (in the case of a manual transmission); a service brake sensing switch 40; a first shift lock relay 42; and a second shift lock relay 44.

Transmission NEUTRAL position sensing switch 34 is associated with transmission 14 to assume a closed position when transmission 14 is in either of its NEUTRAL positions and to assume open position when the transmission is not in either neutral position.

Crank relay 36 is associated with the engine cranking system and appears in the schematic solely for showing actual wiring connections that are involved in circuit 28 at one of the relay's terminals.

Clutch switch 38 is associated with the clutch pedal in a manual transmission vehicle, and is closed when the clutch is engaged (clutch pedal not depressed) and open when the clutch is disengaged (clutch pedal depressed). In an automatic transmission vehicle which does not have a pedal operated clutch, the clutch switch is not present, and it is replaced in the circuit by a jumper cable 46.

Service brake sensing switch 40 is associated with the service brakes to assume a closed position when the service brakes are being applied and an open condition when they are not. When the vehicle has hydraulic-operated service brakes, switch 40 can be a hydraulic pressure sensing switch that operates from open to closed when the brake line hydraulic pressure exceeds a certain magnitude indicative of the service brakes being applied.

Each shift lock relay 42, 44 comprises a respective relay coil 42a, 44a, and a respective normally open contact 42b, 44b. Each coil 42a, 42b has respective terminals 42c, 42d; 44c, 44d, Each normally open contact 42b, 44b has respective terminals 42e, 42f; 44e, 44f.

FIG. 1 portrays a condition for an automatic transmission vehicle where plunger 32 is spring-biased into locking engagement with shifter 18 in the PARK position. Transmission 14 is in one of its NEUTRAL positions causing switch 34 to be closed; service brakes 22 are not being applied causing switch 40 to be open; parking brakes 24 are not being applied by circuit 28 (although they are perhaps being applied by the driver having operated the parking brake control); jumper 46 is in place; relays 42, 44 are not being energized; and ignition switch 26 is in OFF position.

Wires connect the components in various circuit branches. A first branch extends from the ON terminal 26a of ignition switch 26, through transmission NEUTRAL position sensing switch 34, to a terminal of relay 36, and thence through a first sub-branch containing jumper 46, to the engine ECM (electronic control module). When the vehicle is started, voltage is fed through this branch to deliver a signal to the ECM. A second sub-branch parallels the first sub-branch and contains coil 42a of relay 42, with terminal 42c being fed from switch 34 and terminal 42d being connected to ground G.

A second branch extends from the ON terminal 26a of ignition switch 26 to terminal 44e of relay 44, thence from terminal 44f of relay 44 to terminal 42e of relay 42, and thence from terminal 42f of relay 42 to a terminal 30b of solenoid 30. A coil 30a of relay 30 is between terminal 30b and a terminal 30c. The latter terminal is connected to ground G.

A third branch is fed directly from the positive B+ terminal of the vehicle battery and contains brake switch 40 in series with coil 44a of relay 44. The battery feed connects to a terminal 40a of switch 40, a terminal 40b of switch 40 connects to terminal 44c of relay 44, and terminal 44d of relay 44 is grounded at G.

When shifter 18 is in PARK position and vehicle ignition switch 26 is operated to start the engine without service brakes 22 being applied, the first circuit branch becomes hot, causing a signal to be delivered to the engine ECM and causing relay coil 42a to be energized. The energizing of coil 42a operates contact 42b from open to closed, completing a circuit between terminals 42e and 42f. B+ Battery voltage is also fed to terminal 44e of relay 44. Plunger 32 will not be released however until service brakes 22 are applied to close service brake switch 40. When that occurs, B+ battery voltage is fed directly through switch 40, causing coil 44a of relay 44 to be energized. This closes contact 44b to complete a circuit from terminal 44e to terminal 44f. Both contacts 42b and 44b now being closed causes voltage to be fed to energize solenoid 30 and retract plunger 32 from locking relationship with shifter 18. Shifter 18 can now be moved out of PARK position to any other desired position. The nature of the mechanical coupling between plunger 32 and shifter 18 prevents the plunger from again locking the shifter until the latter is once again moved to PARK position. When the shifter is again moved to PARK position, solenoid 30 will deenergize when either brake switch 40 opens or ignition switch 26 is operated to OFF position, and this will enable the spring-biased plunger 32 to once again lock the shifter.

While a presently preferred embodiment of the invention has been illustrated and described, it should be appreciated that the principles of the invention are applicable to all embodiments falling within the scope of the following claims.

What is claimed is:

1. An automotive vehicle comprising:
    a) a powertrain that includes a transmission that is shiftable to plural positions, two of which are NEUTRAL positions;
    b) a shifter disposed for operation by a driver of the vehicle for selectively shifting the transmission to its plural positions;
    c) service brakes;
    d) parking brakes;
    e) an electrical system comprising a battery and an ignition switch that when operated to ON position provides battery voltage at an ignition switch ON terminal; and
    f) a system for selectively locking the shifter in a PARK position that places the transmission in one of its two NEUTRAL positions, wherein the system comprises,
        1) an electrically operated shift lock for releasably locking the shifter in PARK position,
        2) a first controlled conductivity device;
        3) a second controlled conductivity device; and
        4) electric circuitry operatively coupling the shift lock with the transmission and the service brakes comprising a transmission NEUTRAL position sensor that distinguishes between the transmission being in either of its two NEUTRAL positions and not being in either of its two NEUTRAL positions, a service brake sensor that distinguishes between the service brakes being applied and not being applied, a first circuit placing the conductivity of the first controlled conductivity device under the control of the transmission NEUTRAL position sensor, a second circuit placing the conductivity of the second controlled conductivity device under the control of the service brake sensor, and a third circuit placing control of the electrically operated shift lock under the control of both the first controlled conductivity device and the second controlled conductivity device.

2. An automotive vehicle as set forth in claim 1 in which the vehicle further includes a steering column, and both the shifter and the shift lock are mounted on the steering column.

3. An automotive vehicle as set forth in claim 2 in which the shift lock comprises a solenoid that is energized to release the shift lock from locking the shifter.

4. An automotive vehicle as set forth in claim 3 in which the first controlled conductivity device comprises a first relay having a normally open contact, the second controlled conductivity device comprises a second relay having a normally open contact, and wherein both normally open contacts are connected in series relation with each other between the shift lock solenoid and the ignition switch ON terminal.

5. An automotive vehicle as set forth in claim 4 in which the first relay comprises a coil that is energized to close its normally open contact, the second relay comprises a coil that is energized to close its normally open contact, and wherein the first relay coil is connected in the first circuit in series with the transmission NEUTRAL position sensor, and the second relay coil is connected in the second circuit in series with the service brake sensor.

6. An automotive vehicle as set forth in claim 5 in which the service brake sensor comprises a switch that is open when the service brakes are not being applied and closed when the service brakes are being applied.

7. An automotive vehicle as set forth in claim 6 in which the second circuit is fed directly from the battery independent of the position of the ignition switch.

8. An automotive vehicle as set forth in claim 5 in which the transmission NEUTRAL position sensor comprises a switch that is closed then the transmission is in either of its NEUTRAL positions and open when the transmission is not in either of its NEUTRAL positions.

9. An automotive vehicle as set forth in claim 8 in which the first circuit is fed from the ignition switch ON terminal.

10. An automotive vehicle as set forth in claim 1 in which the first controlled conductivity device comprises a first relay having a normally open contact, the second controlled conductivity device comprises a second relay having a normally open contact, and wherein both normally open contacts are connected in series relation with each other between the shift lock and the ignition switch ON terminal.

11. An automotive vehicle as set forth in claim 10 in which the first controlled conductivity device comprises a first relay having a normally open contact and a coil that is energized to close its normally open contact, the second controlled conductivity device comprises a second relay having a normally open contact and a coil that is energized to close its normally open contact, and wherein both normally open contacts are connected in series relation with each other between the shift lock and the ignition switch ON terminal, the first relay coil is connected in the first circuit in series with the transmission NEUTRAL position sensor, and the second relay coil is connected in the second circuit in series with the service brake sensor.

12. An automotive vehicle as set forth in claim 11 in which the service brake sensor comprises a switch that is open when the service brakes are not being applied and closed when the service brakes are being applied, and the transmission NEUTRAL position sensor comprises a switch that is closed when the transmission is in either of its NEUTRAL positions and open when the transmission is not in either of its NEUTRAL positions.

13. For use in an automotive vehicle comprising
a) a powertrain that includes a transmission that is shiftable to plural positions, two of which are NEUTRAL positions,
b) a shifter disposed for operation by a driver of the vehicle for selectively shifting the transmission to its plural positions,
c) service brakes,
d) parking brakes,
e) an electrical system comprising a battery and an ignition switch that when operated to ON position provides battery voltage at an ignition switch ON terminal;

a system for selectively locking the shifter in a PARK position that places the transmission in one of its two NEUTRAL positions, the system comprising:
1) an electrically operated shift lock for releasably locking the shifter in park position,
2) a first controlled conductivity device;
3) a second controlled conductivity device; and
4) electric circuitry for operatively coupling the shift lock with the transmission and the service brakes comprising a transmission NEUTRAL position sensor for distinguishing between the transmission being in either of its two NEUTRAL positions and not being in either of its two NEUTRAL positions, a service brake sensor for distinguishing between the service brakes being applied and not being applied, a first circuit for placing the conductivity of the first controlled conductivity device under the control of the transmission NEUTRAL position sensor, a second circuit for placing the conductivity of the second controlled conductivity device under the control of the service brake sensor, and a third circuit for placing control of the electrically operated shift lock under the control of both the first controlled conductivity device and the second controlled conductivity device.

14. A system as set forth in claim 13 in which the first controlled conductivity device comprises a first relay having a normally open contact and a coil that is energized to close its normally open contact, the second controlled conductivity device comprises a second relay having a normally open contact and a coil that is energized to close its normally open contact, and wherein both normally open contacts are connected in series with each other as a feed to the shift lock, the first relay coil is connected in the first circuit in series with the transmission NEUTRAL position sensor, and the second relay coil is connected in the second circuit to be fed from the service brake sensor.

15. In an automotive vehicle comprising
a) a powertrain that includes a transmission that is shiftable to plural positions, two of which are NEUTRAL positions;
b) a shifter disposed for operation by a driver of the vehicle for selectively shifting the transmission to its plural positions;
c) service brakes;
d) an electrical system comprising a voltage source and an ignition switch that when operated to ON position provides voltage at an ignition switch ON terminal;

a system for selectively locking the shifter in a PARK position that places the transmission in one of its two NEUTRAL positions, the system comprising,
1) an electrically operated shift lock for releasably locking the shifter in PARK position,
2) a first controlled conductivity device;
3) a second controlled conductivity device; and
4) electric circuitry for operatively coupling the shift lock with the transmission and the service brakes comprising a transmission NEUTRAL position sensor for distinguishing between the transmission being in either of its two NEUTRAL positions and not being in either of its two NEUTRAL positions, a service brake sensor for distinguishing between the service brakes being applied and not being applied, a first circuit placing the conductivity of the first controlled conductivity device under the control of the transmission NEUTRAL position sensor, a second circuit placing the conductivity of the second controlled conductivity device under the control of the service brake sensor, and a third circuit placing control of the electrically operated shift lock under the control of both the first controlled conductivity device and the second controlled conductivity device.

* * * * *